(12) United States Patent
Daguenet

(10) Patent No.: US 7,752,851 B2
(45) Date of Patent: Jul. 13, 2010

(54) FASTENING A COMBUSTION CHAMBER INSIDE ITS CASING

(75) Inventor: Luc Henri Claude Daguenet, Corbeil Essonnes (FR)

(73) Assignee: SNECMA, Paris (FR)

( * ) Notice: Subject to any disclaimer, the term of this patent is extended or adjusted under 35 U.S.C. 154(b) by 940 days.

(21) Appl. No.: 11/549,796

(22) Filed: Oct. 16, 2006

(65) Prior Publication Data

US 2007/0107439 A1 May 17, 2007

(30) Foreign Application Priority Data

Oct. 18, 2005 (FR) .................................. 05 10585

(51) Int. Cl.
*F02C 7/20* (2006.01)

(52) U.S. Cl. ......................................... 60/800; 60/752

(58) Field of Classification Search .................. 60/796, 60/797, 798, 799, 800, 752
See application file for complete search history.

(56) References Cited

U.S. PATENT DOCUMENTS

| | | | | |
|---|---|---|---|---|
| 6,286,317 B1 * | 9/2001 | Burrus et al. | ................. | 60/752 |
| 6,708,495 B2 * | 3/2004 | Calvez et al. | ................. | 60/753 |
| 6,732,532 B2 * | 5/2004 | Camy et al. | .................... | 60/796 |
| 6,851,263 B2 * | 2/2005 | Stumpf et al. | ................. | 60/750 |
| 6,904,676 B2 * | 6/2005 | Emilianowicz | ........... | 29/890.01 |
| 7,017,350 B2 * | 3/2006 | De Sousa et al. | .............. | 60/796 |
| 7,234,306 B2 * | 6/2007 | Aumont et al. | ............... | 60/796 |
| 7,249,462 B2 * | 7/2007 | Aumont et al. | ............... | 60/796 |
| 7,568,350 B2 * | 8/2009 | Kreder et al. | ................. | 60/796 |
| 7,578,134 B2 * | 8/2009 | Manteiga et al. | ............. | 60/796 |
| 2002/0184888 A1 | 12/2002 | Calvez et al. | | |

FOREIGN PATENT DOCUMENTS

| | | |
|---|---|---|
| EP | 1 010 944 A2 | 6/2000 |
| GB | 717581 | 10/1954 |
| GB | 1 539 035 | 1/1979 |
| GB | 1 578 474 | 11/1980 |

* cited by examiner

*Primary Examiner*—William H Rodríguez
(74) *Attorney, Agent, or Firm*—Oblon, Spivak, McClelland, Maier & Neustadt, L.L.P.

(57) ABSTRACT

A combustion chamber module includes a combustion chamber attached to a casing. The downstream end of the outer wall of the combustion chamber is secured to an annular connection part having fastener tabs directed in an upstream direction, each tab end being engaged in a hook-forming groove of the casing.

15 Claims, 3 Drawing Sheets

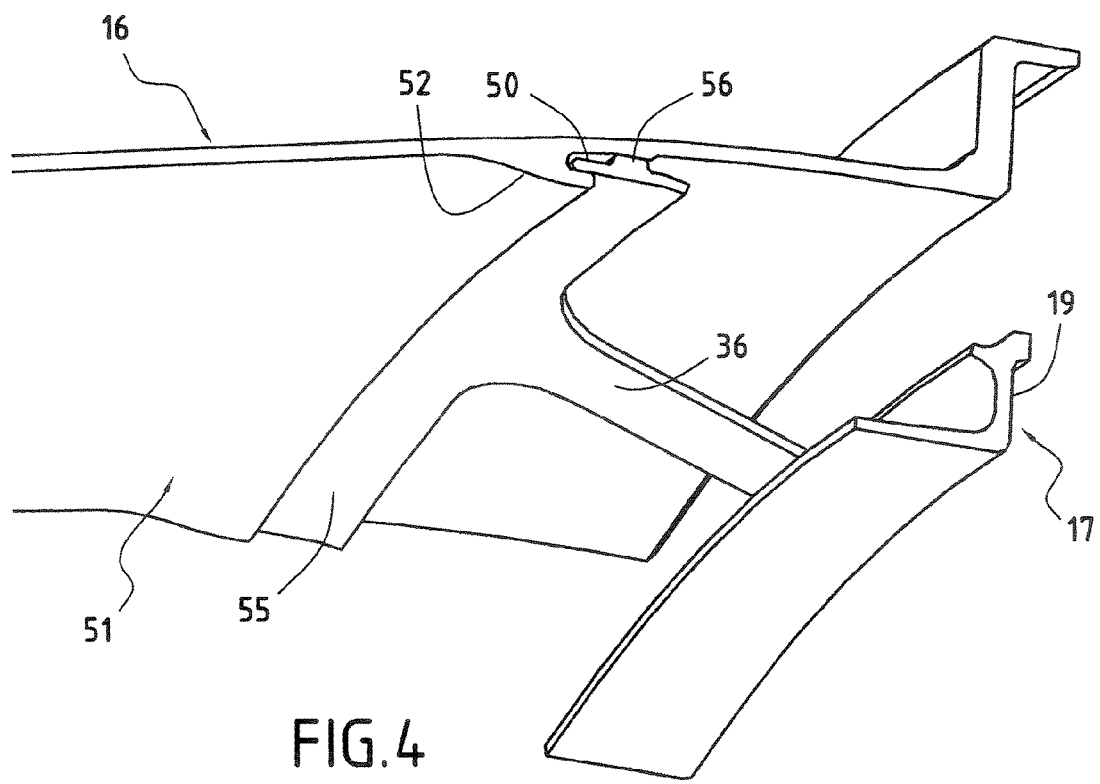
FIG.4
FIG.5
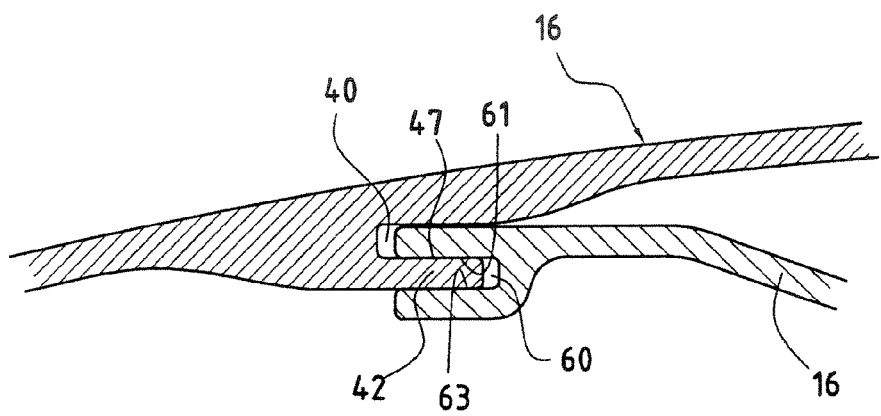

FASTENING A COMBUSTION CHAMBER INSIDE ITS CASING

The invention relates to a turbomachine such as an airplane jet engine, and it relates more particularly to a novel type of mount for mounting an annular combustion chamber inside the casing.

BACKGROUND OF THE INVENTION

In an airplane turbojet, the combustion chamber is secured to the inside of a diffuser casing, upstream from the high-pressure turbine, by means of inner and outer fasteners, and together they form a combustion chamber module. The invention relates to the system of outer fasteners connecting said annular combustion chamber to the inside wall of the casing.

In the description below, the terms "upstream" and "downstream" are used to designate the positions of the elements of the structure relative to one another in the axial direction, taking the gas flow direction as the reference direction.

In the past, proposals have been made to connect the upstream end of the outer wall of the combustion chamber to the wall of the diffuser casing by means of a connection part that is annular and of relatively complex shape. The connection part is welded to the downstream end of the outer wall of the combustion chamber, and includes a flange at its own downstream end that is extended radially upstream and outwards by a conical portion. The conical portion is terminated by a radial annular plate that is bolted between a radial plate defined at the downstream end of the wall of the diffuser casing and another, similar plate of the turbine casing situated downstream from the diffuser casing.

Windows are formed through the conical portion in order to allow the air coming from the compressor to reach means for cooling the turbine. The above-described mount ensures that the combustion chamber is positioned and held inside the diffuser casing, while also allowing for relative displacements of thermal origin in order to limit stresses. Nevertheless, that technology is expensive, in particular because the connection part is complex in shape, and also because the contacting surfaces of the plates must be of excellent planeness, which requires expensive machining.

OBJECTS AND SUMMARY OF THE INVENTION

The invention makes it possible to overcome those difficulties by proposing a mount that is simpler, while also reducing the weight of the system and aerodynamic head losses for the air passing through the connection part.

More particularly, the invention provides a combustion chamber module comprising an annular combustion chamber and an outer casing, the combustion chamber being attached to the outer casing, wherein the downstream end of an outer wall of said combustion chamber is secured to an annular connection part that includes a plurality of fastener tabs directed radially outwards and upstream, and wherein each tab end that is engaged in a hook-forming groove that is laterally open in a downstream direction and that is secured to the inside wall of the casing.

The fastener tabs are regularly distributed circumferentially. They may be eighteen in number.

The total area of the tabs opposing the flow of air is considerably smaller than that of the conical portion in the above-described prior art system, other things being equal.

In one possible embodiment, the inside wall of said casing is provided with a plurality of individualized hook-forming grooves distributed circularly so as to correspond with respective ones of said fastener tabs, each groove receiving the end of one fastener tab.

In another example, the inside wall of the casing is provided with a single groove that is continuous and annular, and that has the ends of all of the fastener tabs engaged therein. In which case, the ends of all of the fastener tabs may be united by a ring that is engaged in said continuous groove.

In the above-defined examples, the fastener tabs are shaped in such a manner that, when cold, clamping is exerted between the end of each tab and the radially outermost surface of such a groove or an adjacent zone of the inside surface of said casing.

In another possibility, the end of each tab is shaped with a groove that is open in an upstream direction and that co-operates with a corresponding one of said grooves of said casing.

In this embodiment, the tabs are shaped so that, when cold, clamping is exerted between the radially outermost surface of the groove of each tab and the radially innermost surface of the corresponding groove of said casing.

BRIEF DESCRIPTION OF THE DRAWINGS

The invention can be better understood and other advantages thereof appear more clearly in the light of the following description of various possible embodiments, given purely by way of example and made with reference to the accompanying drawings, in which:

FIG. 4 is a detail view similar to FIG. 3, showing a variant; and

FIG. 5 is a detail view similar to FIG. 2, showing another variant.

MORE DETAILED DESCRIPTION

Figure 1:
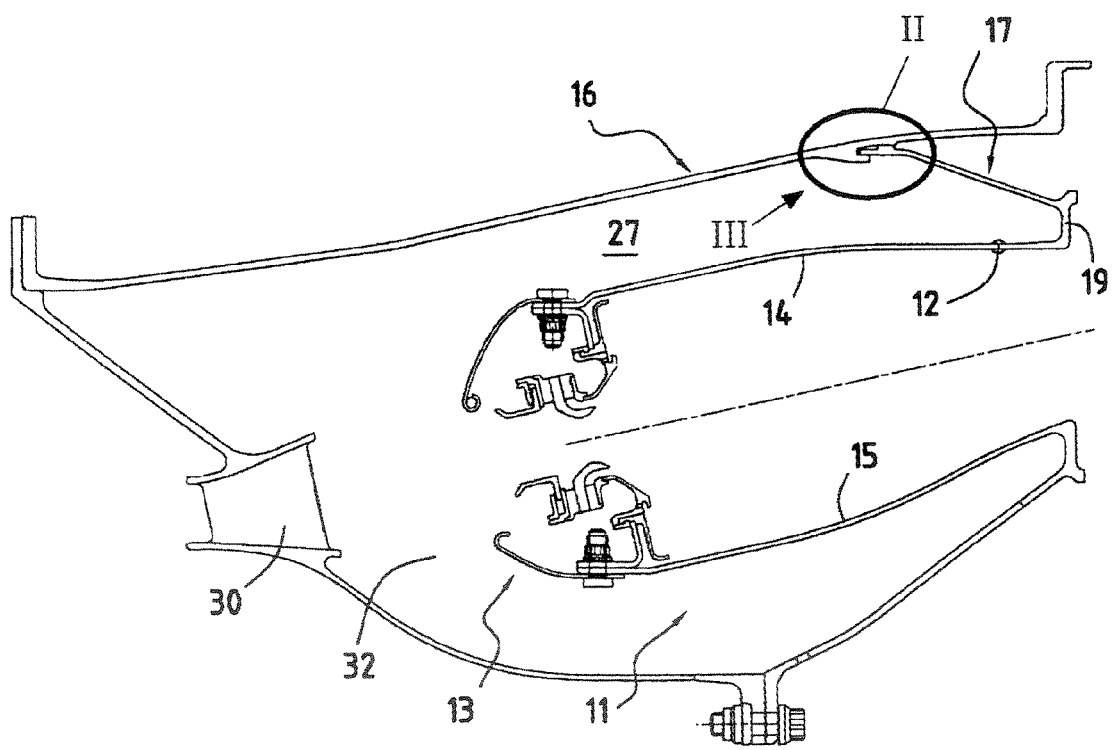
FIG. 1 is a diagrammatic radial section view of the combustion chamber installed in its casing, in accordance with the invention.

With reference more particularly to FIG. 1, there can be seen a diagrammatic half-section showing the essential elements of a combustion chamber 11 installed inside a diffuser casing 16. The assembly forms a combustion chamber module of a turbomachine such as an airplane jet engine. This module is interposed between a compressor situated upstream and a turbine installed downstream. A tube 30 injects air under pressure into an annular cavity 32 within which the combustion chamber is installed. The combustion chamber has an annular outer wall 14, an annular inner wall 15, and a chamber end wall 13, that is likewise annular and through which fuel is injected and mixed with the air supplied by the compressor. The downstream end 12 of the outer wall 14 of the combustion chamber is connected to the wall of the diffuser casing 16 by a connection part 17. The connection part is welded to said downstream end 12.

Another portion of the air flows within the annular cavity 32 all around the combustion chamber, and in particular in the space 27 defined between the casing 16 and the outer wall 14 of said combustion chamber.

With the exception of the shape and the mounting of the annular connection piece 17 that connects the downstream end 12 of the outer wall 14 to the casing 16, the above arrangement is entirely conventional and is not described in greater detail.

Figure 2:
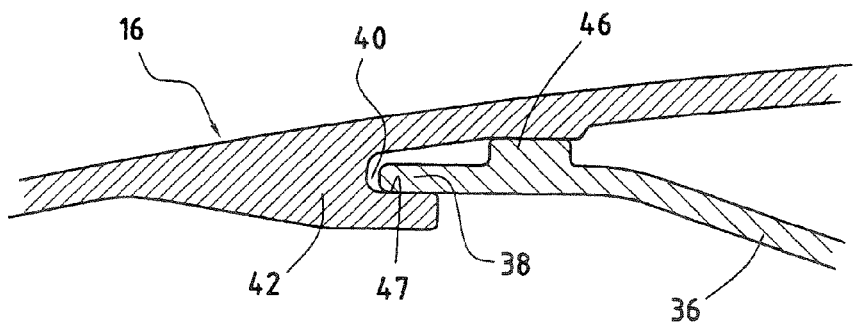
FIG. 2 is a view on a larger scale of detail II of FIG. 1.
Figure 3:
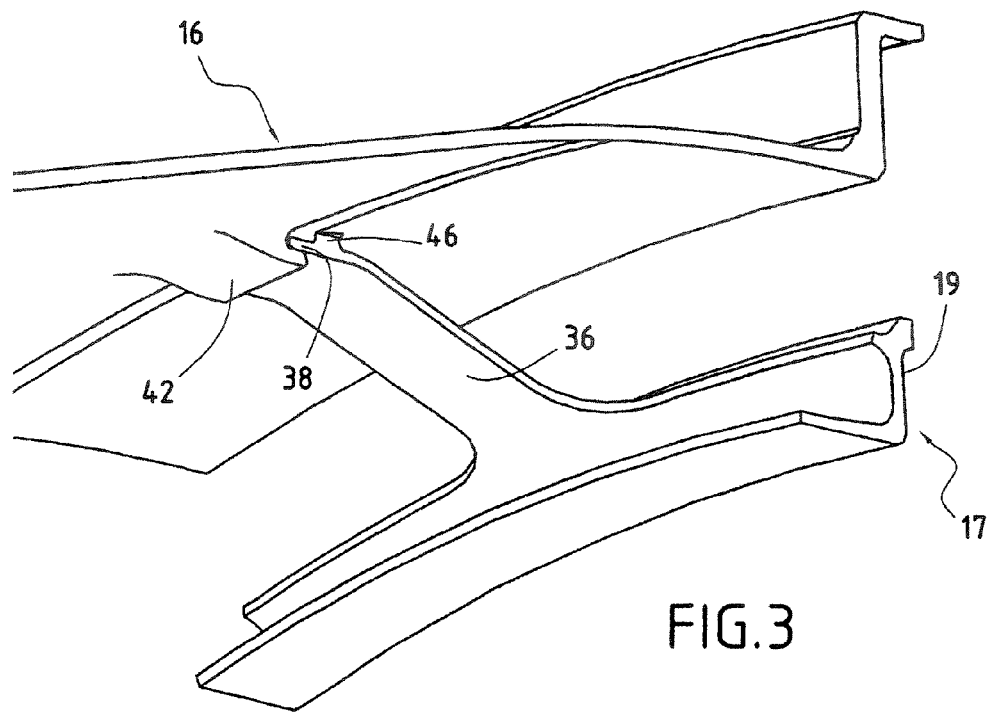
FIG. 3 is a detail view in perspective seen looking along arrow III of FIG. 1.

As can be seen in FIGS. 2 and 3, the connection piece 17 has a connection flange 19 at its downstream end, together with a plurality of fastener tabs 36. The annular connection flange 19 is welded to the downstream end 12 of the outer wall 14 of the combustion chamber.

The fastener tabs 36 are directed radially both outwards and upstream. Each tab end 38 is engaged in a groove 40 that is laterally open in a downstream direction. The groove 40 thus forms a hook. Each groove is defined in a projection 42 of extra thickness in the wall of the casing 16, that projects from its inside face. Thus, the casing has as many internal projections as there are tabs 36, and each projection 42 has a lateral recess facing downstream to define a hook-forming groove 40 as specified above. The tabs 36 and the projections 42 are regularly spaced apart circumferentially. In the example described, there are eighteen tabs. Each groove 40 thus receives the end 38 of a corresponding fastener tab 36. The end portion of each tab includes a projection 46 in contact with the radially outermost surface of the groove or (as shown) with a neighboring zone of the inside surface of the casing. In this example, the projection 46 is situated at a certain distance from the end of the tab.

The tabs 36 are shaped so that, when cold, a clamping force is exerted between the end of the tab, and specifically its projection 46, and the radially outermost surface of the groove, or (in this example) the neighboring inside surface of said casing 16. The mounting is such that a predetermined small amount of clearance exists, when cold, between the radially innermost face 47 of the hook-forming groove and the end 38 of the tab that penetrates into the groove. The clamping force varies in operation, given that the increase in temperature. For all stabilized operating points, there is a clamping force against one of the two faces of the groove. When hot, clamping it is offset essentially against the radially innermost face 47 of the groove 40. This arrangement with dual clamping that varies as a function of temperature enables the maximum clamping value in operation to be decreased, and thus enables stresses to be limited.

In the variant of FIG. 4, the inside wall of the casing 16 is provided with a single groove 50 of the kind specified above, that is continuous and that defines an annular rib 52 projecting from the inside face of the casing. The groove 50 is formed in said rib and opens out laterally in a downstream direction. If the annular part 17 is of the same kind as that shown in FIG. 3, the ends of the fastener tabs 36 are engaged in the single groove. However, this single-groove embodiment is more particularly advantageous when, as shown, the ends of all the fastener tabs 36 are united by a ring 55 that is continuous and engaged in the hook-forming groove 50. This ring includes a rib 56 projecting from its outside surface, and that comes into contact, when cold, against the inside surface of the casing 16. This variant provides an assembly with greater stiffness.

In the example of FIG. 5, the end of each tab is shaped to present a groove 60 that is open in an upstream direction, suitable for co-operating in the assembled position with one of the corresponding grooves 40 of the casing. The tabs 36 are shaped so that, when cold, clamping is exerted between the radially outermost surface 61 of the groove 68 defined at the end of each tab and the radially innermost surface 47 of the corresponding groove of the casing. Clearance is defined when cold between the radially innermost surface 63 of the groove of the tab and the inside surface of the projection 42 in which the corresponding groove 40 of the casing is defined. When hot, this clearance disappears and the clamping is offset to this location.

Naturally, the grooves 40 could be replaced by a single continuous annular groove, and the grooves 60 could constitute a single annular groove defined in a ring interconnecting the tabs 36.

What is claimed is:

1. A combustion chamber module comprising an annular combustion chamber and an outer casing, the combustion chamber being attached to the outer casing, wherein the downstream end of an outer wall of said combustion chamber is secured to an annular connection part that includes a plurality of fastener tabs directed radially outwards and upstream, wherein each portion of each tab is engaged in a hook-forming groove that is laterally open in a downstream direction and that is secured to the inside wall of the casing, wherein each end portion of each tab includes a projection situated at a distance from the end of the tab, said projection being in contact with said radially outermost surface of the groove or the inside surface of said casing, and wherein said fastener tabs are shaped in such a manner that, when cold, clamping is exerted between said projection of each tab and the radially outermost surface of the groove or the inside surface of said casing.

2. A combustion chamber module according to claim 1, wherein said fastener tabs are regularly distributed circumferentially.

3. A combustion chamber module according to claim 2, wherein said fastener tabs are eighteen in number.

4. A combustion chamber module according to claim 1, wherein the inside wall of said casing is provided with a plurality of individualized hook-forming grooves distributed circularly so as to correspond with respective ones of said fastener tabs, each groove receiving the end of one fastener tab.

5. A combustion chamber module according to claim 1, wherein the inside wall of the casing is provided with a single groove that is continuous and annular, and that has the ends of all of the fastener tabs engaged therein.

6. A combustion chamber module according to claim 5, wherein the ends of all of the fastener tabs are united by a ring that is engaged in said continuous groove.

7. A turbomachine including a combustion chamber module according to claim 1.

8. A combustion chamber module according to claim 1, wherein said projection is in contact with said radially outermost surface of the groove, and wherein said fastener tabs are shaped in such a manner that, when cold, clamping is exerted between said projection of each tab and the radially outermost surface of the groove.

9. A module according to claim 1, wherein said projection being in contact with the inside surface of said casing, and wherein said fastener tabs are shaped in such a manner that, when cold, clamping is exerted between said projection of each tab and the inside surface of said casing.

10. A module according to claim 1, wherein the tabs are secured to the casing without any bolts.

11. A combustion chamber module comprising an annular combustion chamber and an outer casing, the combustion chamber being attached to the outer casing, wherein the downstream end of an outer wall of said combustion chamber is secured to an annular connection part that includes a plurality of fastener tabs directed radially outwards and upstream, and wherein each tab end that is engaged in a hook-forming groove that is laterally open in a downstream direction and that is secured to the inside wall of the casing, wherein the end of each tab is shaped with a groove that is open in an upstream direction and that co-operates with a corresponding one of said grooves of said casing.

12. A combustion chamber module according to claim 11, wherein said tabs are shaped so that, when cold, clamping is exerted between the radially outermost surface of the groove of each tab and the radially innermost surface of the corresponding groove of said casing.

13. A combustion chamber module according to claim 11, wherein said fastener tabs are regularly distributed circumferentially.

14. A combustion chamber module according to claim 13, wherein said fastener tabs are eighteen in number.

15. A combustion chamber module according to claim 11, wherein the inside wall of said casing is provided with a plurality of individualized hook-forming grooves distributed circularly so as to correspond with respective ones of said fastener tabs, each groove receiving the end of one fastener tab.

* * * * *